United States Patent [19]

Jones

[11] Patent Number: 5,533,390
[45] Date of Patent: Jul. 9, 1996

[54] ANTI-PERCH ATTACHMENT FOR A SENSOR

[76] Inventor: Thaddeus M. Jones, 1302 High St., South Bend, Ind. 46601

[21] Appl. No.: 404,247

[22] Filed: Mar. 15, 1995

[51] Int. Cl.⁶ .................... G01D 11/00; A01K 37/00; A01K 15/04
[52] U.S. Cl. .................. 73/170.16; 73/432.1; 119/712; 119/713
[58] Field of Search ................ 73/170.16, 29.01, 73/29.02, 29.05, 866.5, 432.1, 431, 170.17, 170.21, 864.51, 864.91; 119/712, 713, 738, 23, 25, 30, 31, 72.5, 74, 75

[56] References Cited

U.S. PATENT DOCUMENTS

| | | | |
|---|---|---|---|
| 175,606 | 4/1876 | Hillman | 119/23 |
| 243,501 | 6/1881 | Brown | 119/74 |
| 2,201,901 | 5/1940 | Keen | 119/74 X |
| 2,457,159 | 12/1948 | Kofford | 119/72.5 |
| 2,624,201 | 1/1953 | Thomson | 73/864.51 |
| 2,652,722 | 9/1953 | Wood | 73/170.16 |
| 2,900,821 | 8/1959 | Rich | 73/170.16 X |
| 3,372,586 | 3/1968 | Chodwick | 73/174.21 |
| 4,928,513 | 5/1990 | Sugihara et al. | 73/29.05 X |
| 5,450,063 | 9/1995 | Peterson et al. | 119/713 X |
| 5,458,093 | 10/1995 | MacMillan | 119/720 |

OTHER PUBLICATIONS

Nixalite of America, Inc., (Form No. 594) "Architectural Bird Control" ©1993, pp. 1–4 Printed in U.S.A. + end page.

Primary Examiner—Thomas P. Noland
Attorney, Agent, or Firm—R. Tracy Crump

[57] ABSTRACT

An attachment used with a sensor, which includes an exposed sensing element, for preventing birds and animals from perching over the sensing element is disclosed. The attachment includes an elongated bent rod and a mechanism for mounting the rod to one of the side walls of the sensors. When mounted to the sensor's side walls, the bent configuration of the rod defines an open area adjacent the sensing element, which is exposed from an end wall of the sensor. The rod's distal end segment extends longitudinally over and is spaced from the sensing element, while the other segments of the rod are spaced laterally and diagonally from the sensing element. The distal end segment is spaced above the top of the device at a specific height to prevent interference with the operation of the device while preventing birds and animals from moving between the distal end segment and the sensing element. In addition, the laterally extending segments of the rod are inclined to prevent birds and animals from perching on them. The length of the rod is selected to extend a sufficient distance from the sensor's end upper wall, upon which the sensing element is located, to prevent large birds from straddling the sensor.

12 Claims, 5 Drawing Sheets

ANTI-PERCH ATTACHMENT FOR A SENSOR

This invention relates to an attachment for a sensor, which prevents animals and birds from perching on or over the exposed sensing element of the sensor without effecting the operation of the sensor.

BACKGROUND OF THE INVENTION

Perching and nesting birds and animals present a serious problem for a variety of structures and devices. A variety of apparatus have been developed to actively prevent animals and birds from perching or nesting on or near sensitive structures, equipment and crops. Netting and needle strips are commonly used to physically prevent animals and birds from intruding around sensitive structures and equipment. Needle strips, such as the ones manufactured by Nixalite of America, Inc. of East Moline, Ill., consist of a plurality of thin protruding needles or barbs fastened to elongated bands, which are mountable to the perch-sensitive structure or device. The protruding needles of the needle strips prevent birds from physically landing on the structures.

Enclosing structures and equipment with netting or covering them with needle strips is often aesthetically undesirable. Netting and needle strips are also functionally undesirable in many applications where the surrounding environment can not be significantly altered. For example, netting and needle strips are unsuitable for use with environmental control sensors, such as moisture, humidity and precipitation detection sensors. These types of environmental control sensors typically include sensing elements that are exposed to its environment for receiving various external control input. Any physical obstruction surrounding the sensing elements can affect the accuracy and consistency of their readings. Snow and ice often adhere to the nets, screens, and needle strips used to protect the sensors, and accumulate around and over the sensing elements, which results in inaccurate and inconsistent sensor readings. In addition, nets, screens and needle strips collect leaves and other debris, which further obstruct the area immediately around the exposed sensing elements.

SUMMARY OF THE INVENTION

The anti-perch attachment of this invention physically prevents birds and animals from perching atop or over remote sensors without substantially obstructing the physical environment immediately surrounding its sensing element. The attachment of this invention is inexpensive and easily adapted for use on any conventional sensor, in particular, environmental control sensors. While the attachment of this invention is specifically adapted for use with various control and measurement sensors, the attachment can be use with any perch-sensitive device which has an exposed perch sensitive area or component, which can not be substantially obstructed by the attachment.

The attachment includes an elongated bent rod and a mechanism for mounting the bent rod to one of the side walls of the sensor. When mounted to the sensor's side walls, the bent configuration of the rod defines an open area adjacent the sensing element, which is exposed from an end wall of the sensor. The rod's distal end segment extends longitudinally over and is spaced from the sensing element, while the other segments of the rod are spaced laterally and diagonally from the sensing element. The distal end segment is spaced above the sensing element at a specific distance to avoid interference with the operation of the device while preventing birds and animals from moving between the distal end segment and the sensing element. In addition, the laterally extending segments of the rod are inclined to prevent birds and animals from perching on them. The length of the rod is selected to extend a sufficient distance from the sensor's end upper wall, upon which the sensing element is located, to prevent large birds from straddling the sensor.

Accordingly, an advantage of this invention is to provide for an inexpensive attachment to prevent birds and animals from perching or nesting on or over the sensing element of a sensor.

Another advantage of this invention is to provide for an anti-perch attachment for a sensor, which does not substantially obstruct the immediate environment surrounding its sensing element.

Other advantages will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

The preferred embodiments herein described are not intended to be exhaustive or to limit the invention to the precise form disclosed. They are chosen and described to explain the principles of the invention and its application and practical use to enable others skilled in the art to utilize its teachings.

Figure 1:
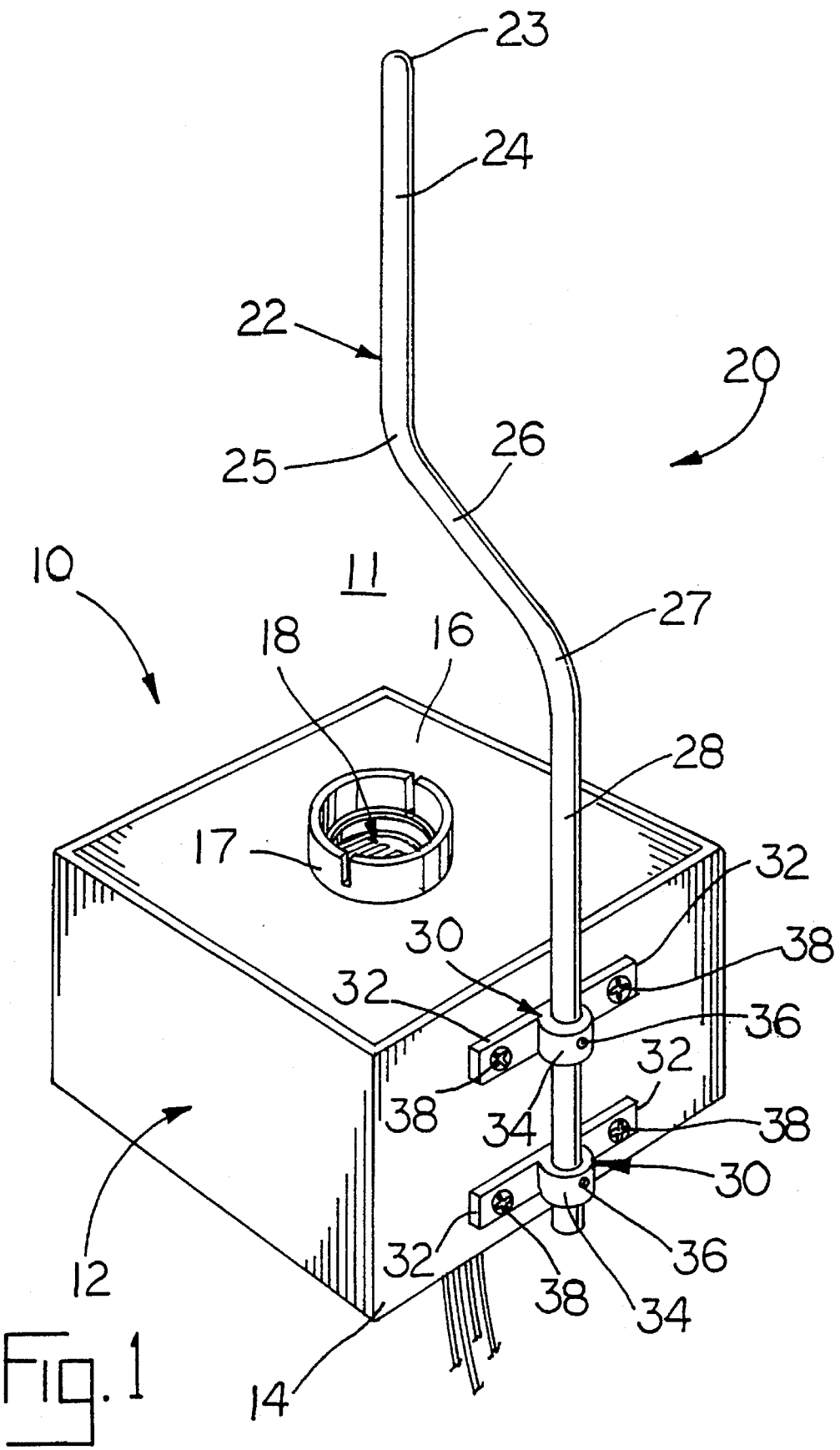
FIG. 1 is a perspective view of the anti-perch attachment of this invention mounted to a conventional environmental sensor having a rectangular housing.
Figure 2:
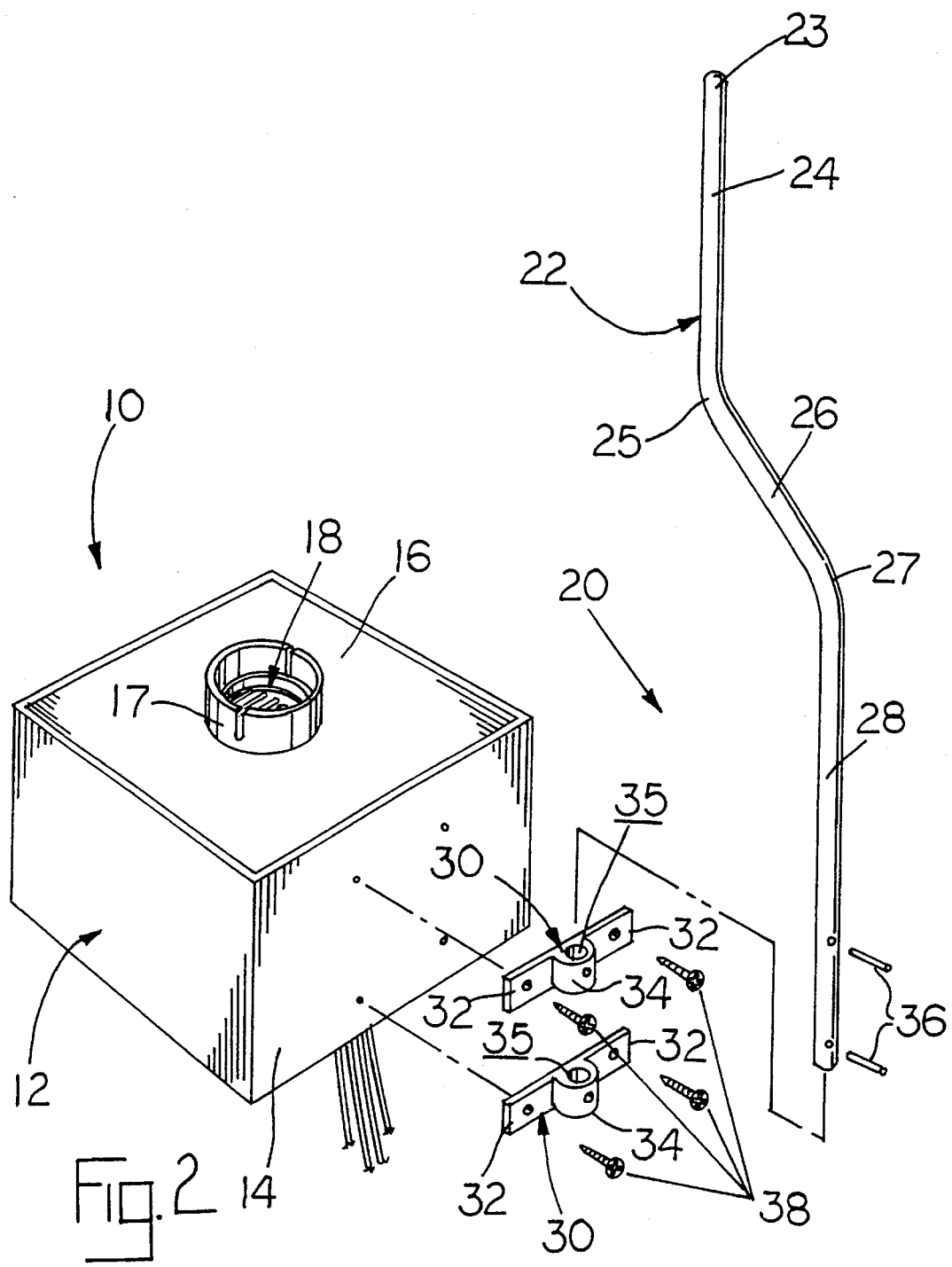
FIG. 2 is an exploded view of the attachment of FIG. 1.
Figure 3:
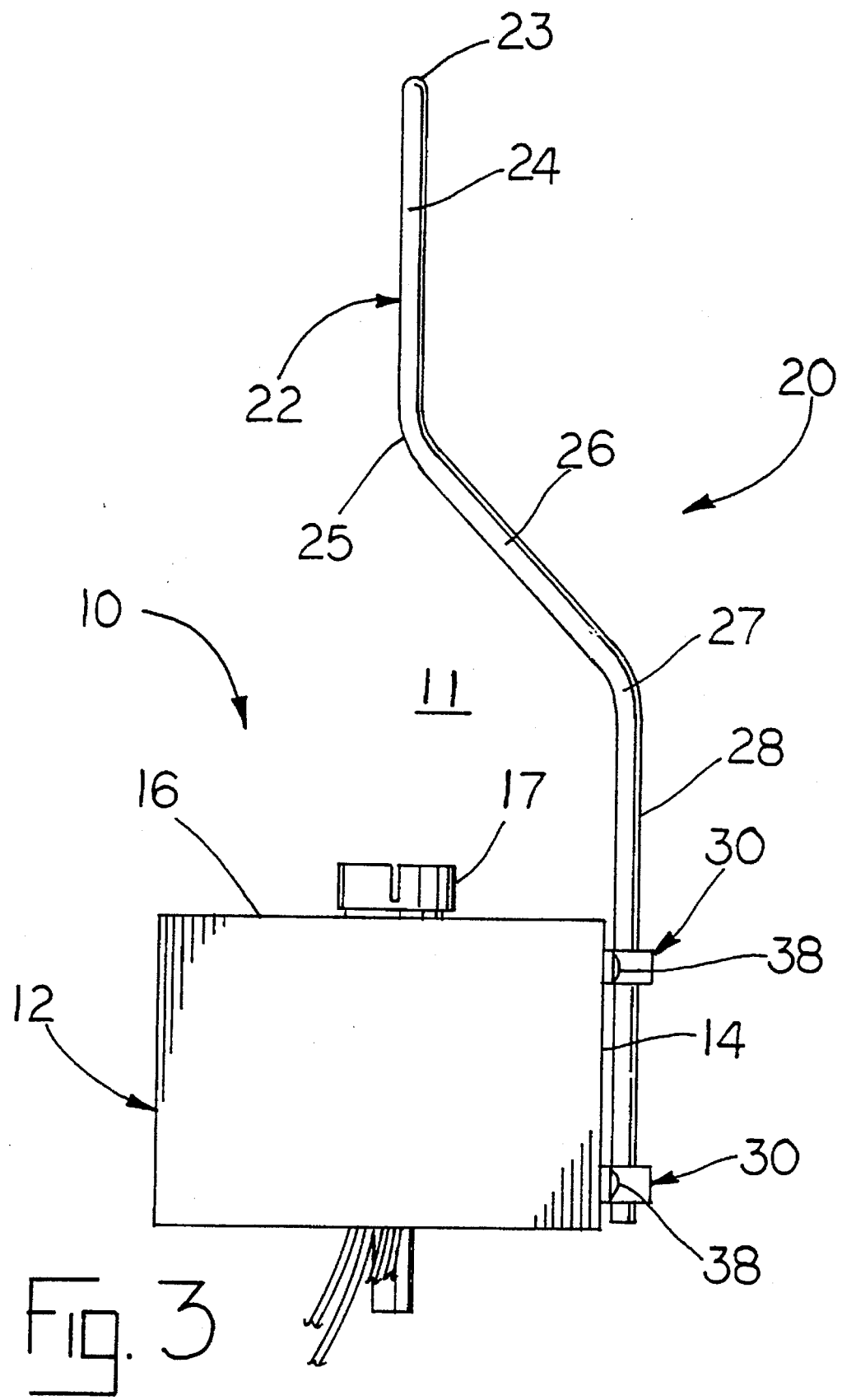
FIG. 3 is a side view of the attachment of FIG. 1.

FIGS. 1–3 show one embodiment of the anti-perch attachment 20 of this invention mounted to one embodiment of a control sensor 10. For illustrative purposes only, the control sensor 10 is shown as a moisture sensor, such as the ones manufactured by Environmental Technology, Inc. of South Bend, Ind.; however, the attachment can be used with a variety of conventional control sensors. Sensor 10 includes a box shaped outer housing 12 and sensing element 18 (interdigitated electrodes as shown). Housing 12 includes four side walls 14 and an upper end wall 16 on which sensing element 18 is located. A wind shield or collar 17 protrudes upwardly around sensing element 18.

Attachment 20 includes an elongated bent rod 22, which is preferably made of a non-corrosive metal, such as anodized aluminum or an ultra-violet inhibited thermoplastic. As shown, rod 22 has a bend 25 and a return bend 27, which forms three integral segments: an inclined intermediate segment 26 and two parallel end segments 24, 28 in an S-shaped configuration. Preferably, bend 25 and return bend 27 are approximately at 45° angles. The distal tip 23 of end segment 24 is rounded to reduce the potential gradient, which decreases the probability of a lightning strike.

As shown in FIGS. 1 and 3, rod 22 is mounted to one of housing side walls 14 so that distal end segment 24 extends longitudinally over and is spaced from sensing element 18. Rod 22 is mounted to housing side wall 14 by two yoke brackets 30 and fasteners 38; although, any conventional method can be employed to secure the proximal end segment to the housing side wall. Each bracket 30 is shaped generally as shown in FIG. 2, including two side tabs 32 and a central cylindrical band 34 having an opening 35 for receiving proximal end segment 28. Each bracket 30 is mounted to side wall 14 by fasteners 38, which extend through aligned bores in side tabs 32 and side wall 14. Proximal end segment 28 extends through bores 35 in each bracket 30 and is secured by pins 36, which prevent rod 22 from sliding downward or rotating with opening 35. Pins 36 extend through aligned bores in band 34 and proximal end segment 28.

As best shown in FIG. 3, the bent S-shaped configuration of rod 22 defines an open area 11 surrounding sensing element 18. When proximal end segment 28 is secured to housing side wall 14, distal end segment 24 is centered over and spaced above sensing element 18, intermediate segment 26 is diagonally spaced from the sensing element and proximal end segment 28 is spaced laterally from the sensing element. The bent configuration of rod 20 spaces each segment 24, 26 and 28 sufficiently from sensing element 18 to prevent interference with the operation of sensor 10, while preventing birds and animals from moving around the sensing element underneath the rod. The length of distal end segment 24 is selected to extend above upper wall 16 a sufficient height to prevent large birds from straddling sensing element 18. In addition, the incline of intermediate segment 26 is sufficient to prevent birds and animals from perching on that segment.

Figure 4:
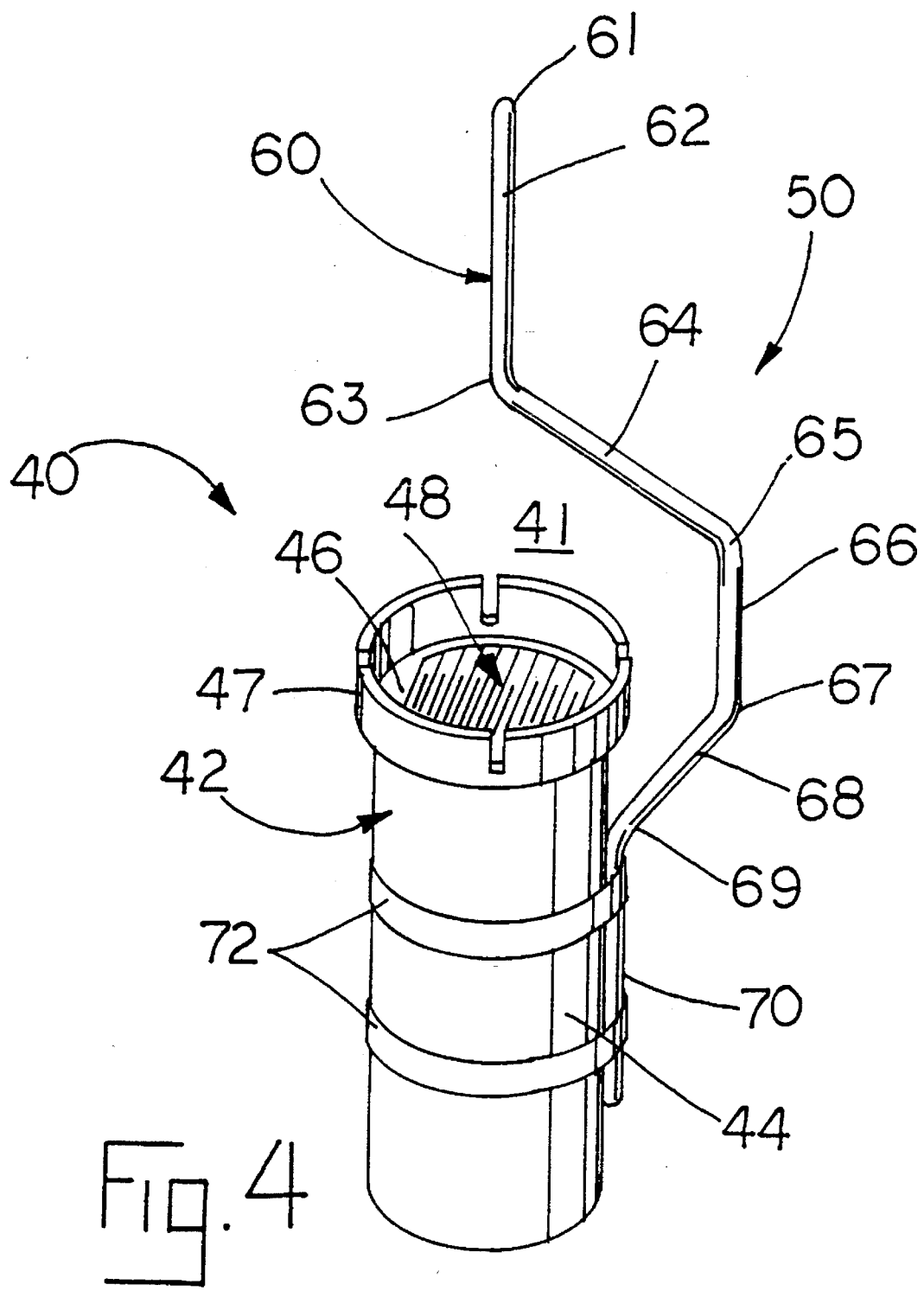
FIG. 4 is a perspective view of a second embodiment of the anti-perch attachment of this invention mounted to second conventional environmental sensor having a cylindrical housing.
Figure 5:
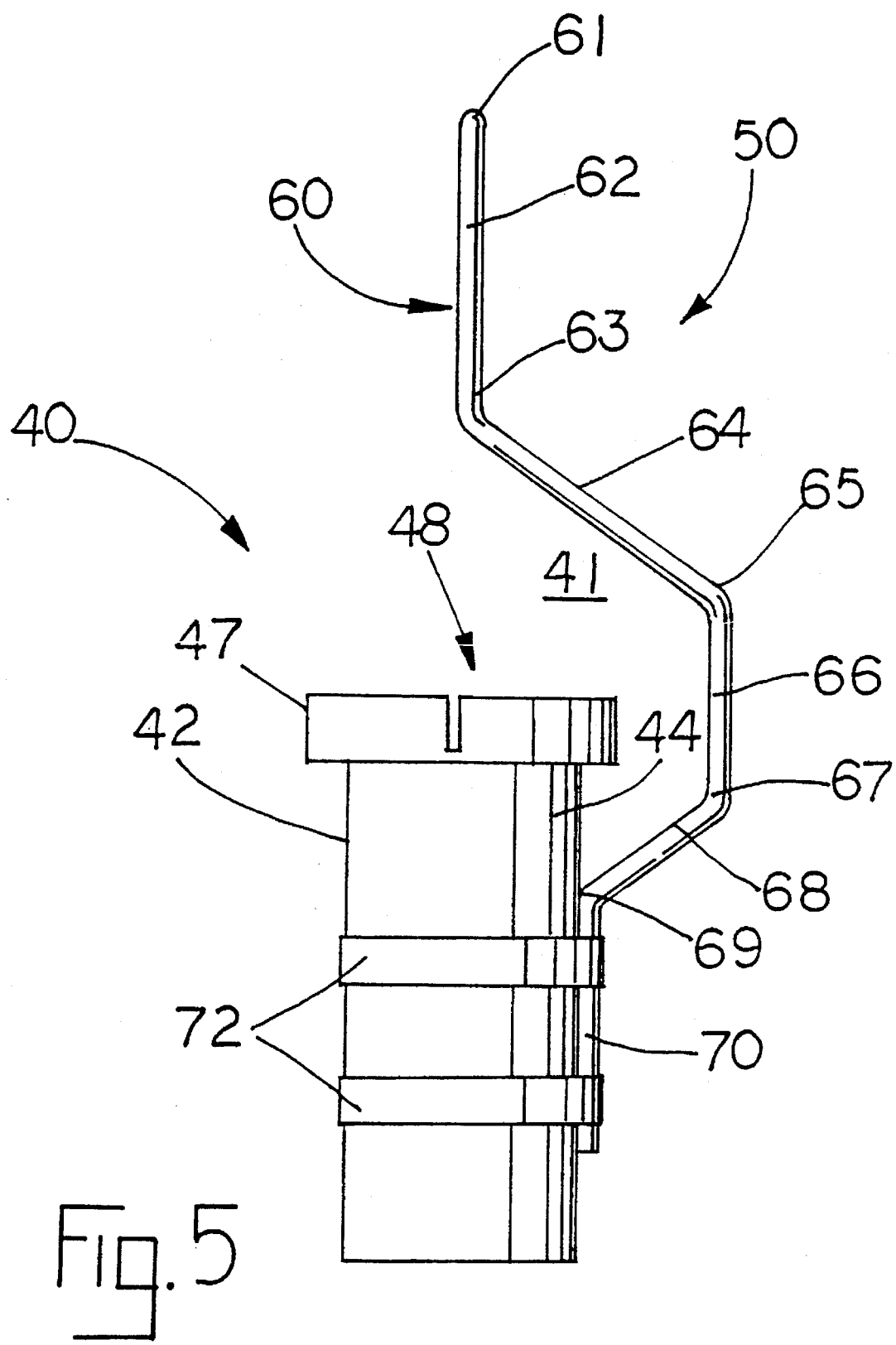
FIG. 5 is a side view of the attachment of FIG. 4.

FIGS. 4 and 5 show a second embodiment of the anti-perch attachment 50 of this invention used with a different model of control sensor 40. Sensor 40 has a cylindrical housing 42 and a sensing element 48 (interdigitated electrodes as shown). Housing 42 includes a tubular side wall 44 and an upper end wall 46 on which sensing element 48 is located. End wall 46 has an annular wind shield or collar 47, which protrudes beyond side wall 44 around sensing element 48.

Attachment 50 includes an elongated rod 60 bent in the shape of a crank shaft throat. Rod 60 is preferably made of a non-corrosive metal, such as anodized aluminum or ultra-violet inhibited thermoplastic. As shown, rod 60 has a first bend and return bend 63, 65 and a second bend and return bend 67, 69, which form five integral segments: 62, 64, 66, 68, 70. As shown, distal end segment 62, intermediate segment 66, and proximal end segment 70 are longitudinally parallel and segments 64 and 68 extend diagonally at opposed angles between segments 62, 66 and 70. Proximal end segment 70 is connected to housing side wall 44 so that distal end segment 62 extends longitudinally over and is spaced from sensing element 48. Preferably, bends 63, 67 and return bends 65, 69 are at approximately 45° angles. The distal tip 61 of end segment 62 is rounded to reduce the potential gradient, which decreases the probability of a lightning strike. Rod 60 is mounted to housing side wall 44 by two mounting bands or collars 72; however, any conventional method for securing the proximal end segment to the housing side wall can be employed.

As best shown in FIG. 5, the bent "crank shaft" shaped configuration of rod 60 defines an open area 41 surrounding sensing element 48. When proximal end segment 70 is secured to housing side wall 44, distal end segment 62 is centered over and spaced above sensing element 48, segments 64 and 68 are diagonally spaced from the sensing element and intermediate segment 66 is spaced laterally from the sensing element. The bent configuration of rod 60 spaces each segment 62–70 sufficiently from sensing element 48 to prevent interference with the operation of sensor 40, while preventing birds and animals from moving around the sensing element underneath the rod. The second bend and return bend 67, 69 provide additional lateral spacing of intermediate segment 66 from sensing element 48 and lateral clearance around end flange 47. The length of distal end segment 62 is selected to extend above end wall 46 a sufficient height to prevent large birds from straddling sensing element 48. In addition, the incline of segment 64, 68 is sufficient to prevent birds and animals from perching on that segment.

It is understood that the above description does not limit the invention to the details given, but may be modified within the scope of the following claims.

I claim:

1. An attachment for a sensor, which includes a side wall, an end wall and an exposed sensing element mounted to said end wall, for preventing birds and animals from perching over said sensing element, said attachment comprising:

an elongated bent rod including proximal and distal end segments and an intermediate segment connected between said proximal and distal end segments, and means for mounting said proximal end segment to said side wall at a location laterally spaced from said sensing element, said rod defining an open area adjacent said sensing element when said proximal end segment is mounted to said side wall wherein said distal end segment extends longitudinally over and is spaced from said sensing element, said intermediate segment is spaced diagonally from said sensing element, and said proximal end segment is spaced laterally from said sensing element.

2. The attachment of claim 1 wherein said rod has a bend and a return bend defining said proximal end segment, said intermediate segment and said distal end segment.

3. The attachment of claim 1 wherein said intermediate segment is connected between said proximal and distal end segments at an angle with respect to said sensing element to prevent birds and animals from perching on said intermediate segment when said proximal end segment is mounted to said side wall.

4. The attachment of claim 1 wherein said distal end segment has a length sufficient to prevent birds having a size in a range above a minimal size from straddling said sensing element when said proximal end segment is mounted to said side wall.

5. The attachment of claim 1 wherein said proximal end segment includes a proximal end connectable to said side wall and a distal end spaced laterally from said side wall and connected to said intermediate segment.

6. The attachment of claim 1 wherein said distal end segment terminates in a rounded distal tip.

7. In combination, a sensor including a side wall, an end wall and an exposed sensing element mounted to said end wall, and an attachment mounted to said side wall for preventing birds and animals from perching over said sensing element, said attachment comprising:

an elongated bent rod including proximal and distal end segments and an intermediate segment connected between said proximal and distal end segments, and means for mounting said proximal end segment to said side wall at a location laterally spaced from said sensing element, said rod defining an open area adjacent said sensing element wherein said distal end segment extends longitudinally over and is spaced from said sensing element, said intermediate segment is spaced diagonally from said sensing element, and said proximal end segment is spaced laterally from said sensing element.

8. The combination of claim 7 wherein said rod has a bend and a return bend defining said proximal end segment, said intermediate segment and said distal end segment.

9. The combination of claim 7 wherein said intermediate segment is connected between said proximal and distal end segments at an angle with respect to said sensing element to prevent birds and animals from perching on said intermediate segment.

10. The combination of claim 7 wherein said distal end segment has a length sufficient to prevent birds having a size in a range above a minimal size from straddling said sensing element.

11. The combination of claim 7 wherein said proximal end segment includes a proximal end connectable to said side wall and a distal end spaced laterally from said side wall and connected to said intermediate segment.

12. The combination of claim 7 wherein said distal end segment terminates in a rounded distal tip.

\* \* \* \* \*